United States Patent [19]

Takamoto

[11] Patent Number: 5,709,445
[45] Date of Patent: Jan. 20, 1998

[54] OBLIQUE PROJECTION OPTICAL SYSTEM

[75] Inventor: Katsuhiro Takamoto, Nagaokakyo, Japan

[73] Assignee: Minolta Co., Ltd., Osaka, Japan

[21] Appl. No.: 675,481

[22] Filed: Jul. 3, 1996

[30] Foreign Application Priority Data

Jul. 6, 1995 [JP] Japan .................. 7-170639

[51] Int. Cl.⁶ .................................................. G03B 21/14
[52] U.S. Cl. .................................................. 353/70; 353/69
[58] Field of Search .................... 353/70, 69, 101

[56] References Cited

U.S. PATENT DOCUMENTS

| | | | |
|---|---|---|---|
| 5,032,022 | 7/1991 | Sato et al. | 353/70 |
| 5,096,288 | 3/1992 | Yano et al. | 353/69 |
| 5,220,363 | 6/1993 | Sato et al. | 353/70 |
| 5,274,406 | 12/1993 | Tejima et al. | 353/70 |
| 5,302,983 | 4/1994 | Sato et al. | 353/70 |
| 5,422,691 | 6/1995 | Ninomiya et al. | 353/70 |
| 5,442,413 | 8/1995 | Tejima et al. | 353/70 |

FOREIGN PATENT DOCUMENTS

| | | |
|---|---|---|
| 3-084515 A | 4/1991 | Japan . |
| 3-113432 | 5/1991 | Japan . |
| 3-141337 A | 6/1991 | Japan . |
| 4-107521 | 4/1992 | Japan . |
| 5-100312 A | 4/1993 | Japan . |
| 5-134213 | 5/1993 | Japan . |

*Primary Examiner*—William Dowling
*Attorney, Agent, or Firm*—Burns, Doane, Swecker & Mathis, LLP

[57] ABSTRACT

An optical system projects an enlargement of an image of an object surface on a screen inclined relative to the object surface. The optical system includes an afocal first lens unit including a diaphragm and at least a second lens unit. The optical axis of the afocal system is not collinear with a normal line from the object surface, i.e., the afocal system is eccentric to the object surface. The second lens unit is eccentric relative to the afocal lens unit.

23 Claims, 8 Drawing Sheets

OBLIQUE PROJECTION OPTICAL SYSTEM

BACKGROUND OF THE INVENTION

1. Field of the Invention

The present invention relates to an oblique projection optical system for projecting enlargements of a film image, video image or the like on a screen inclined relative to the object surface of the image.

2. Description of the Related Art

Heretofore, various projection optical systems have been developed to project enlargements of film images, video images or the like on a screen. In recent years, a problem has arisen as projection systems have become larger in conjunction with the increasing size of projection screens. Oblique projection type optical systems which project an image obliquely on a screen have been proposed as one means to limit the increase in size of projection systems while enlarging the screen area.

If an image is projected obliquely on the screen, however, a so-called trapezium distortion of the projected image occurs. Various proposals have been made to correct this distortion.

For example, Japanese Unexamined Patent Application No. HEI 3-84515 discloses a device which performs reverse trapezium distortion on an image by means of a trapezium distortion generating optical system provided between a projection lens and an image display device. After the image is formed on an intermediate screen, this image is projected obliquely on a final screen by a projection lens so as to suppress trapezium distortion in a final projection image.

Japanese Unexamined Patent Application No. HEI 3-113432 discloses a device which corrects trapezium distortion by providing a correction optical unit and a correction optical unit drive device for a projection lens. These elements are designed to generate decentration distortion aberration by a parallel decentering of the correction optical unit in a direction perpendicular to the optical axis of the projection lens.

Japanese Unexamined Patent Application No. HEI 3-141337 discloses a device which corrects trapezium distortion and origin displacement of an image on a screen by providing a means for decentralized driving of lenses of part of a projection lens, and generating decentration distortion aberration by decentration .driving of at least two lenses among the lenses of the projection lens via the drive means.

Japanese Unexamined Patent Application No. HEI 5-100312 discloses a device for projecting undistorted images by providing a screen and light bulb for displaying an image on a liquid crystal display which is shifted in mutually parallel and mutually opposite directions relative to the optical axis of a projection system. The projection system also uses a wide angle lens having a wide field angle as a projection lens so as to use part of the field angle of the wide angle lens for projection.

Furthermore, Japanese Unexamined Patent Application No. HEI 4-107521 discloses a device which corrects trapezium distortion of an image using a projection system comprising a first and second afocal optical units and a Fresnel reflecting mirror disposed between the first and second optical units. An enlargement of an original image is formed on the Fresnel reflection mirror via the first afocal optical unit to obtain an intermediate image and subsequently enlarging and projecting the intermediate image on an inclined screen via the second afocal optical unit.

Japanese Unexamined Patent Application No. HEI 5-134213 discloses a device for correcting trapezium distortion of an image projected on a screen by providing an adjunct optical unit (afocal converter lens) anterior to a projection lens and inclining the position of the adjunct optical unit.

The oblique projection optical devices of the aforesaid disclosures have disadvantages in achieving a working device.

The device described in Japanese Unexamined Patent Application No. HEI 3-84515 is difficult to realize because concrete construction and numerical data relating to the trapezium distortion generating optical system are not disclosed. Furthermore, there are disadvantageous light loss and high cost because an intermediate screen is used.

Japanese Unexamined Patent Application No. HEI 3-113432 does not mention correction of aberrations other than distortion aberration, and the device has difficulty attaining adequate correction of aberration.

By the parallel decentration of two lenses disclosed in Japanese Unexamined Patent Application No. HEI 3-141337, aberration cannot be adequately eliminated, and it is difficult to satisfy the actual requirements of the device.

The device disclosed in Japanese Unexamined Patent Application No. HEI 5-100312 has a comparatively high cost because only a part of the field angle of the projection lens is used. Furthermore, when the projection field angle is large, disadvantages arise such as the inability to achieve a suitable inclination of oblique projection. The device disclosed in Japanese Unexamined Patent Application No. HEI 4-107521 cannot be easily realized because specific numerical data of the optical system are not disclosed. In addition, the overall length of the optical system and lens diameter cannot be reduced because the actual image is enlarged using an afocal optical unit, i.e., a bilateral telocentric optical unit, to form an intermediate image which is then enlarged and projected by a second afocal optical unit. In the device disclosed in Japanese Unexamined Patent Application No. HEI 5-134213, the realizable inclination between projector and screen surface is small at about 9 degrees. Thus, in a construction wherein only an adjunct optical system is inclined, it is difficult to achieve greater inclination.

SUMMARY OF INVENTION

A main object of the present invention is to provide an oblique projection optical system which eliminates the aforesaid disadvantages.

A further object of the present invention is to provide an oblique projection optical system capable of producing a projected image having adequate correction of trapezium distortion and aberration.

Another object of the present invention is to provide a compact oblique projection optical system capable of producing a projected image having adequate correction of trapezium distortion and aberration.

Still another object of the present invention is to provide an inexpensive and practical oblique projection optical system capable of producing a projected image having adequate correction of trapezium distortion and aberration.

These and other objects are attained by an oblique projection optical system for projecting an enlargement of an image of an object surface on a screen inclined relative to the object surface. The oblique projection optical system includes at least a first lens unit, such as an afocal optical system with a diaphragm and which is eccentric relative to an object surface, and a second lens unit which is eccentric relative to the first lens unit, wherein the oblique projection optical system is physically not connected to a front surface of a screen on which an image is formed.

The previously mentioned objects are further attained by an oblique projection optical system comprising a plurality of mutually eccentric lens units including an afocal lens unit with a diaphragm and disposed eccentrically to an object surface, the oblique projection optical system not being connected to an actual image on a front surface of a screen, and which satisfies the conditional expression |fa/f|>5. In the conditional expression, f is the focal length of the overall projection optical system, and fa is the focal length of the lens unit with a diaphragm.

The aforesaid objects are further attained by an oblique projection optical system which projects an enlargement of an image of an object surface on a screen inclined relative to the object surface. The oblique projection optical system includes at least a first lens unit, such as an afocal optical system with a diaphragm and which is eccentric relative to an object surface, and a second lens unit. The second lens unit is eccentric relative to the first lens unit, is disposed on the side closest to the screen, and is provided with positive refracting power. The optical axis of the oblique projection optical system can be considered a reference line passing through the center of an object surface and is inclined in the same direction as the inclination of the screen surface, and is shifted to be parallel to a line approaching the intersection of the object surface and the screen surface. The oblique projection optical system is not connected to a front of a screen on which an image is formed.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DETAILED DESCRIPTION

Embodiments of the present invention are described hereinafter with reference to the accompanying drawings. In the following description, decentering of a specific lens unit and another specific lens unit means the optical axes of these lens units diverge, i.e., the optical axes of the units are shifted so that they are not co-linear either because they intersect at an angle and/or are offset relative to one another. Decentering of a specific lens unit and a specific surface means the normal lines at the optical axis of the lens unit and the center of the surface diverge. Decentering of a specific surface and another specific surface means the normal lines passing through the center of the surfaces are mutually divergent. In other words, the lens units and surfaces are eccentric relative to one another.

Mutual divergence of the optical axes and normal lines means a state wherein the straight lines are mutually inclined to each other and form an angle, a state wherein one or another optical axis or normal line is shifted to be off-set but parallel to the optical axis or normal line of the other, or a state wherein both of the foregoing states are combined. Inclination of a specific lens unit and a specific surface means the normal line passing through the center of the surface and the optical axis of the lens unit is inclined.

Figure 1:
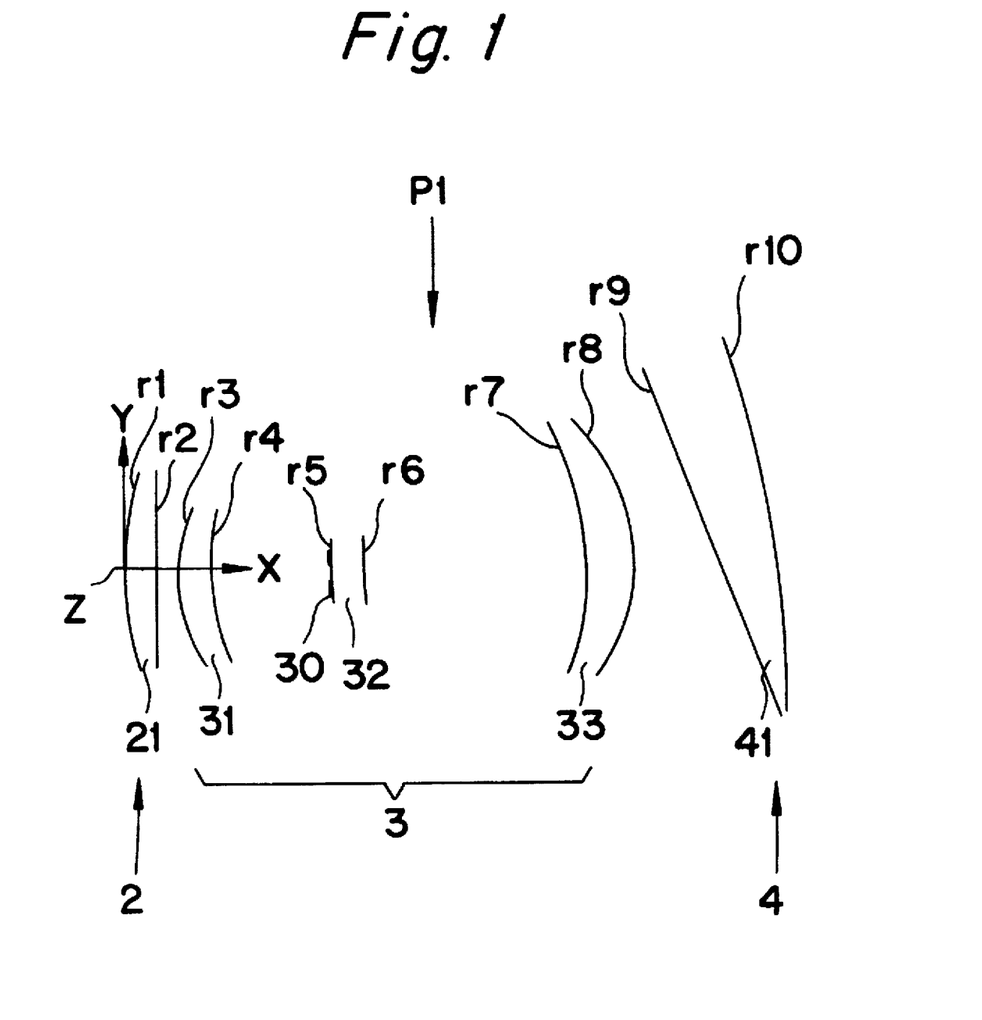
FIG. 1 is a sectional view of lens units of a projection optical system of a first embodiment of the present invention.
Figure 2:
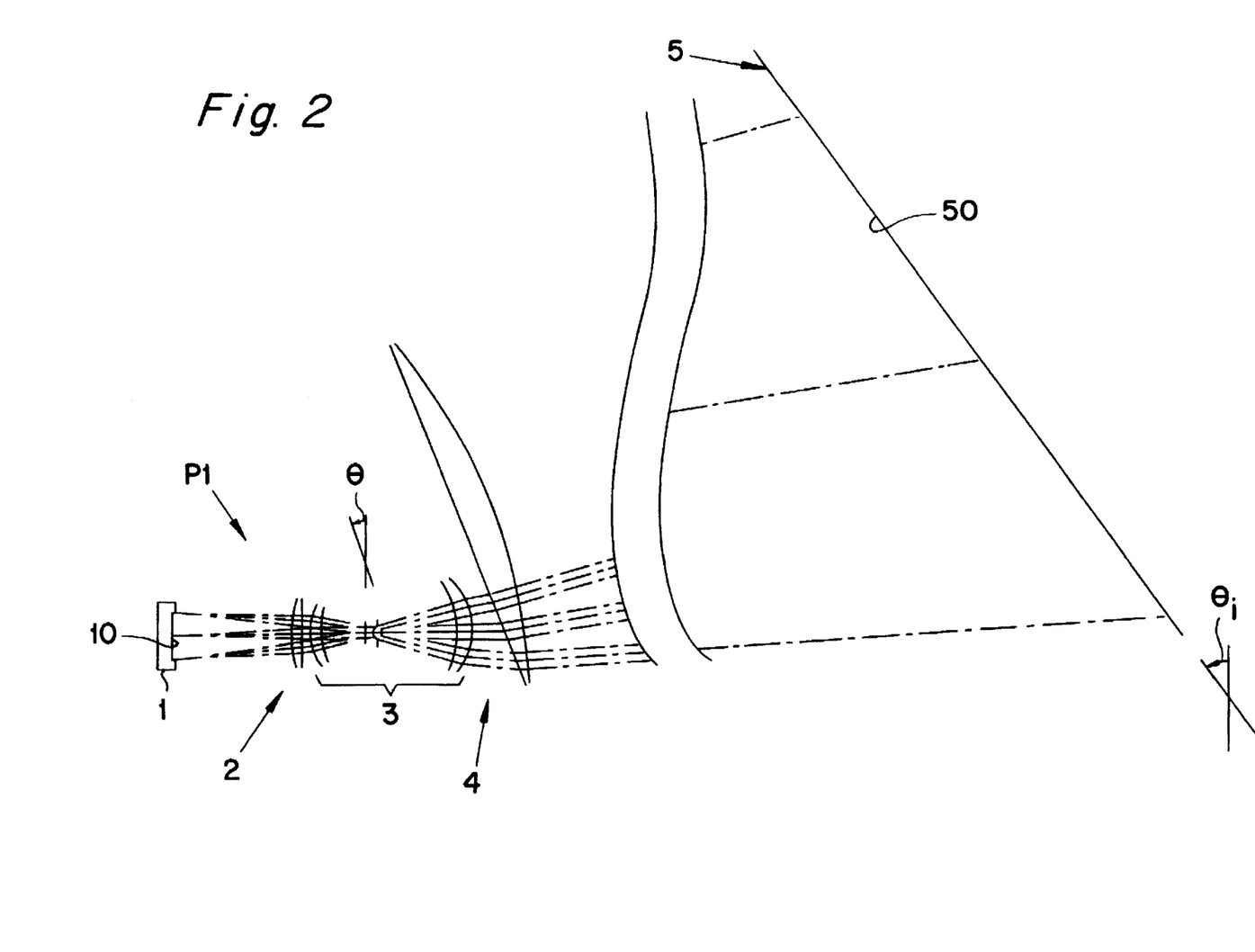
FIG. 2 briefly shows the construction of a projection optical apparatus of the first embodiment.
Figure 3:
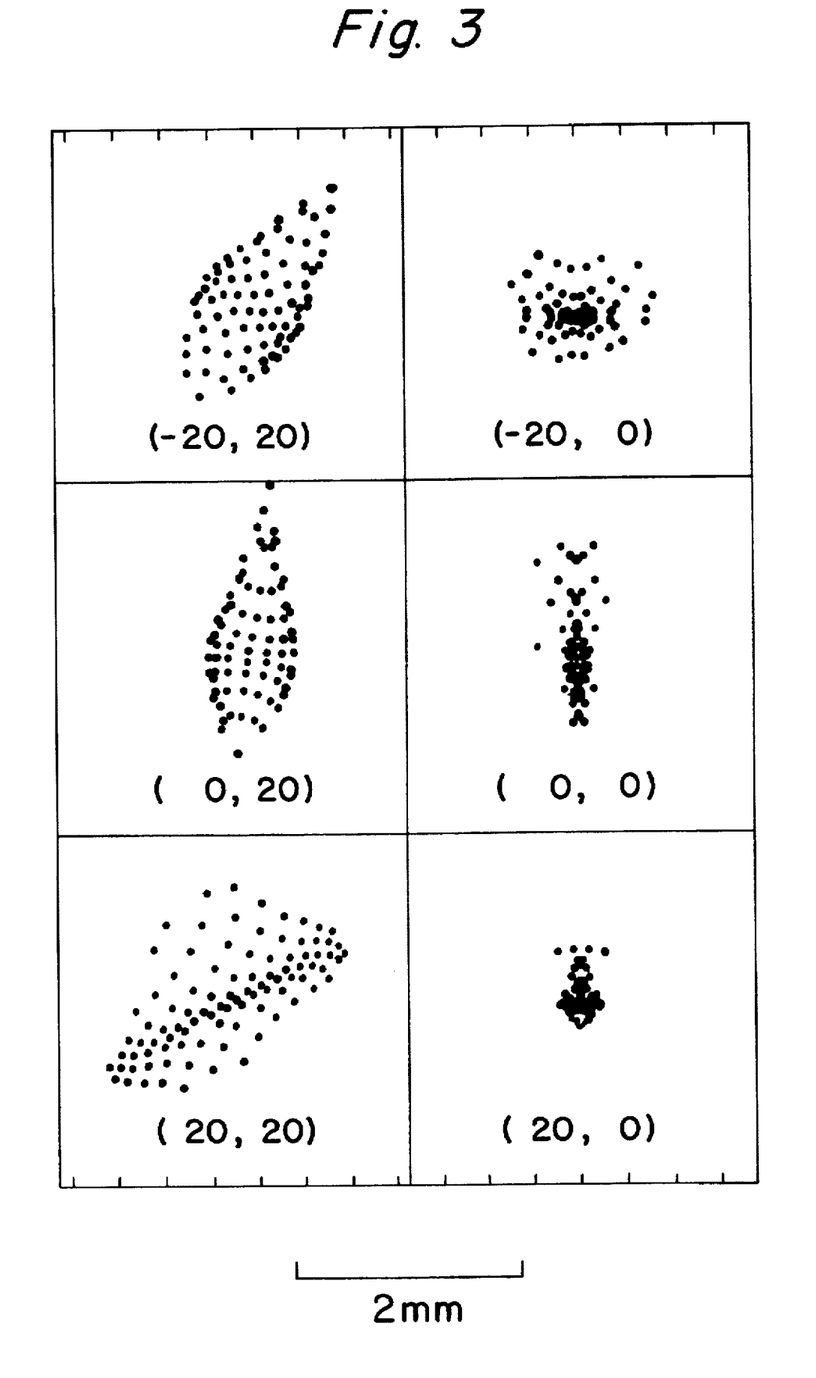
FIG. 3 is a spot diagram showing the intersection points of the light rays emitted from object points relative to the image surface.
Figure 4:
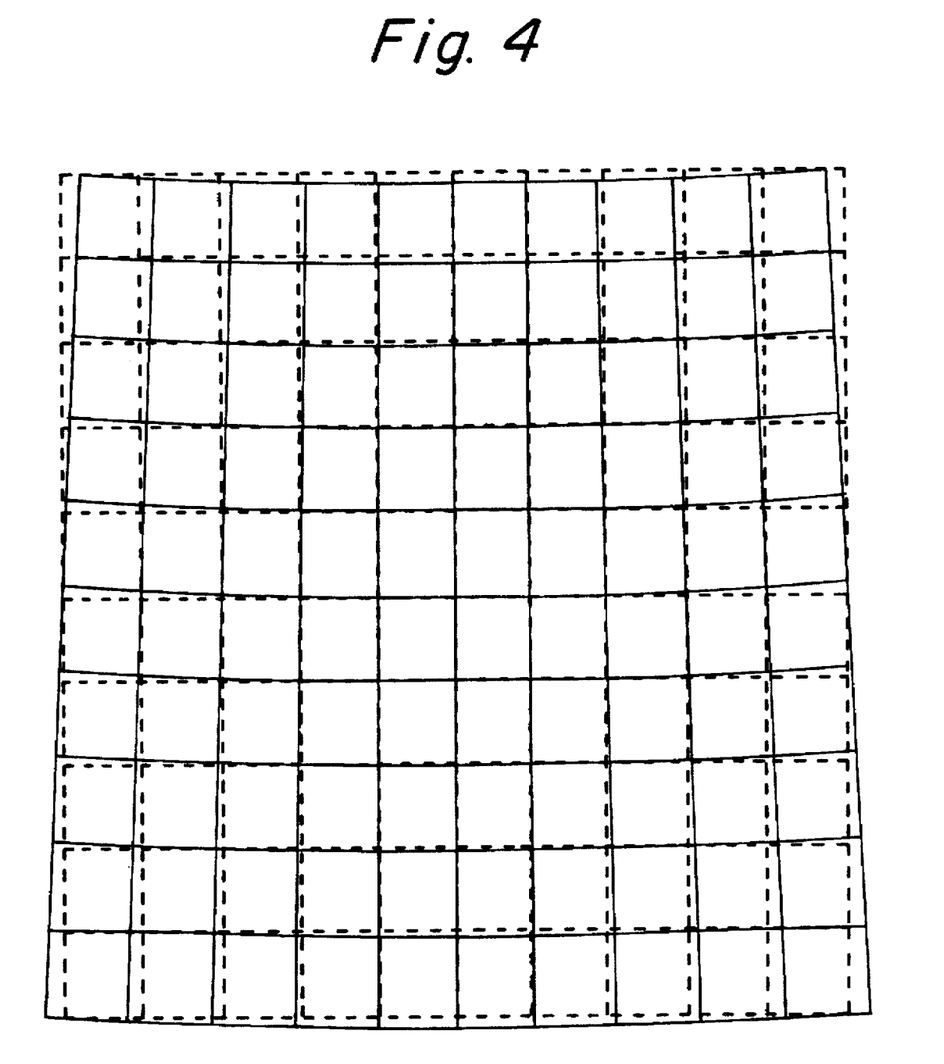
FIG. 4 illustrates the degree of distortion of a projected lattice pattern.

FIGS. 1 through 4 relate to a first embodiment. FIG. 1 is a section view of lens units of a projection optical system according to a first embodiment. FIG. 2 briefly shows the construction of a projection apparatus provided with the projection optical system, and the optical path of same. FIG. 3 is a spot diagram showing the intersections of light rays from object points of an object surface and an image surface. FIG. 4 shows a lattice pattern (image expressed by solid lines) enlarged (13.7×) on a screen. The image indicated by the dashed lines is an ideal image without distortion.

The apparatus of the first embodiment comprises an image display device 1 provided with an object screen 10 for projecting enlargements, a projection optical system P1, and a screen 5 for forming a final image surface 50, as shown in FIG. 2.

The object surface 10 of the image display device is a square measuring 40 mm on each edge, for example. The projection system P1 comprises three lens units 2, 3, and 4 arranged sequentially along an optical axis projecting from the object surface 10 side of the image display device 1. The three lens units 2, 3, and 4 are mutually decentered.

The first lens unit 2 on the outermost object surface side comprises a single lens 21. The second lens unit 3 comprises three lenses 31, 32, and 33. The second lens unit 3 has a diaphragm or aperture 30 disposed on the object surface side of the second of its lenses 32. The focal length fa of the second lens unit 3 is 1100.2 mm and virtually infinite within this exemplary system. That is, the second lens unit 3 is an afocal optical system lens unit. The optical axis of the second lens unit 3 is inclined relative to the object surface 10.

The third lens unit 4 comprises a single lens 41 with a positive refracting power. The focal length of the lens unit 4 is 855.15 mm in this exemplary embodiment.

The relationship between the focal length f of the overall optical system and the focal length fa of the second lens unit 3 in this example is |fa/f|=6.4 which is greater than 5.

Inclination θi of image surface 50 relative to object surface 10 is about 36 degrees in this exemplary embodiment. Projection magnification β in the center light ray vicinity passing through the center of object surface 10 is −13.7. This magnification is negative, and expresses the actual image on the screen plane.

The inclination θ of afocal optical system the second lens unit 3 relative to the object surface 10 satisfies the following condition.

$$\theta_i/(|\beta|\times\theta)=0.59$$

The inclination of the second lens unit 3 is achieved by rotating around an axis parallel to the z-axis (described later)

through a surface vertex of the lens surface (r3 in FIG. 1) on the outermost object surface side of the second lens unit 3.

The optical axis of the third lens unit 4 is standardized as a normal line through the center of the object surface 10 and inclined in the same direction as the inclination of the image surface 50, and is shifted to be parallel and offset to a direction approaching the line of intersection of the normal lines of the object surface 10 and the image surface 50.

Parameters relating to the three lens units 2, 3, and 4, and the object surface 10, and the image surface 50 are shown in Table 1 for this exemplary embodiment. In Table 1, "r1, r2, r3, ... r8, r9, r10" refer to the various lens surfaces of lenses 21, 31, 32, 33, and 41, as shown in FIG. 1. "Radius of curvature" refers to the radius of curvature of each lens surface (units: mm). "Positive" refers to a convex surface and "negative" refers to a concave surface relative to the direction of travel of the light rays. "Axial distance" refers to the spacing between adjacent lens surfaces, and axial distance between a diaphragm and an adjacent lens (units: mm). "Refractive index" refers to the refractive index of material between adjacent lens surfaces in each lens unit, and between a diaphragm and adjacent lens surface. A refractive index of 1.00000 refers not to the refractive index of a lens, but rather the index of the an airspace.

Reference symbols X, Y, Z shown in Table 2 refer to surface vertex coordinates (X, Y, Z) of the lens surfaces (r1, r3, r9 in FIG. 1) of the outermost lens unit on the object surface side. Coordinates (X, Y, Z) refer to the center coordinates of the object surface and image surface.

In both first and second embodiments, the X-axis in the XYZ coordinate system is set in the optical axis direction (the direction of light ray travel is positive by convention) of the lens with the surface vertex (surface vertex is r1 in the first embodiment) of the lens nearest the object surface 10 designated as the origin. The Y-axis is an axis in a vertical direction perpendicular to the X-axis. The Z-axis is an axis perpendicular to both the X-axis and the Y-axis (axis perpendicular to the paper surface in FIG. 1). "ANG" refers to the inclination angle (units: degrees) of the X-axis relative to the optical axis of a lens unit, and the inclination angle of the X-axis relative to the normal line of the object surface and image surface. In all cases, rotating counterclockwise in the drawing is designated as being negative.

Furthermore, ymax and ymin refer to the area in the Y-axis direction of the object surface 10, and zmax and zmin refer to the area in the Z-axis direction of the object surface 10.

TABLE 1

| | Radius of Curvature | Axial Distance | Refractive Index |
|---|---|---|---|
| (Lens Unit 2) | | | |
| r1 | 101.4230 | | |
| | | 10.0000 | 1.69680 |
| r2 | −1081.4200 | | |
| | | | 1.00000 |
| (Lens Unit 3) | | | |
| r3 | 50.4431 | | |
| | | 10.0000 | 1.69680 |
| r4 | 74.6787 | | |
| | | 37.0000 | 1.00000 |
| Diaphragm 30 | ∞ | | |
| | (Diaphragm radius 4) | | |
| | | 1.0000 | 1.00000 |
| r5 | −1008.2400 | | |
| | | 10.0000 | 1.80518 |

TABLE 1-continued

| | Radius of Curvature | Axial Distance | Refractive Index |
|---|---|---|---|
| r6 | 71.1607 | | |
| | | 70.0000 | 1.000000 |
| r7 | −85.4752 | | |
| | | 15.0000 | 1.59844 |
| r8 | −57.3316 | | |
| | | | 1.00000 |
| (Lens Unit 4) | | | |
| r9 | −7780.5300 | | |
| | | 30.0000 | 1.59844 |
| r10 | −480.8660 | | |

TABLE 2

| | X | Y | Z | ANG |
|---|---|---|---|---|
| Object Surf. 10 | −99.9473 | −4.6280 | 0.0000 | −0.7612 |
| Unit 2 | 0.0000 | 0.0000 | 0.0000 | 0.0000 |
| Unit 3 | 16.5818 | −6.0457 | 0.0000 | −5.9433 |
| Unit 4 | 142.6121 | 105.4211 | 0.0000 | −23.7837 |
| Image Surf 50 | 2199.7505 | 390.1844 | 0.0000 | −36.9177 |
| ymax: 20.0000 | ymin: −20.0000 | | | |
| zmax: 20.0000 | zmin: −20.0000 | | | |

The distortion indices of the final image surface 50 is shown in Table 3 below.

In Table 3, "object height" is expressed as coordinates the distance (in all cases units: mm) in the Y-axis direction and distance in the Z-axis direction from an origin position (X, Y, Z) of the object surface 10 in Table 2 to an object point. "Image height" is expressed by coordinates (y,z) when the X-axis is the normal line direction of the image surface 50 with the center light ray passing through the center of the object surface (0,0) is designated the origin point through the image surface 50, the Y-axis is the vertical axis direction within the image surface 50 perpendicular to the X-axis, and the Z-axis is an axis perpendicular to both the X- and Y-axes. The ideal image height is expressed as (y,z), and the distorted image height is expressed as (y+dy, z+dz). The distorted image height is calculated by the center point of the spot diagram. The expression dy/r is the distortion index in the Y-axis direction, and dz/r is the distortion index in the Z-axis direction.

Spot diagrams corresponding to object points of various object heights are shown in FIG. 3. The projection image projected on screen 5 is shown in FIG. 4.

TABLE 3

| Object Hgt. | Distortion Index dy/r | Distortion Index dz/r |
|---|---|---|
| (20, 0) | −0.0234 | 0.0000 |
| (−20, 0) | −0.0265 | 0.0000 |
| (20, 20) | 0.0017 | −0.0337 |
| (0, 20) | 0.0242 | 0.0012 |
| (−20, −20) | −0.0041 | 0.0346 |

It can be determined from these distortion indices whether or not distortion is adequately corrected in the final projection image. The trapezium distortion in the final projection image is adequately corrected as shown in FIG. 4.

Figure 5:
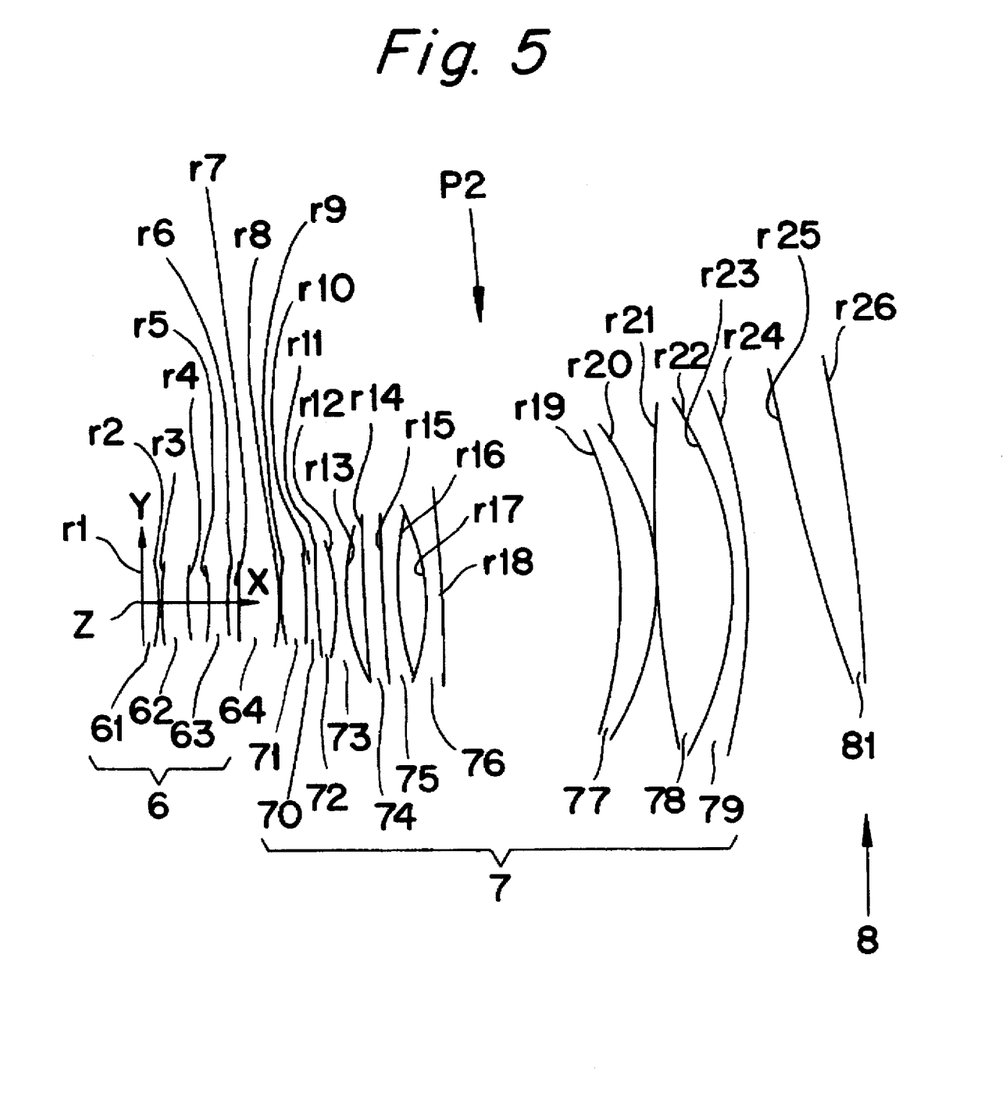
FIG. 5 is a section view of a lens unit of a projection optical system of a second embodiment of the present invention.
Figure 6:
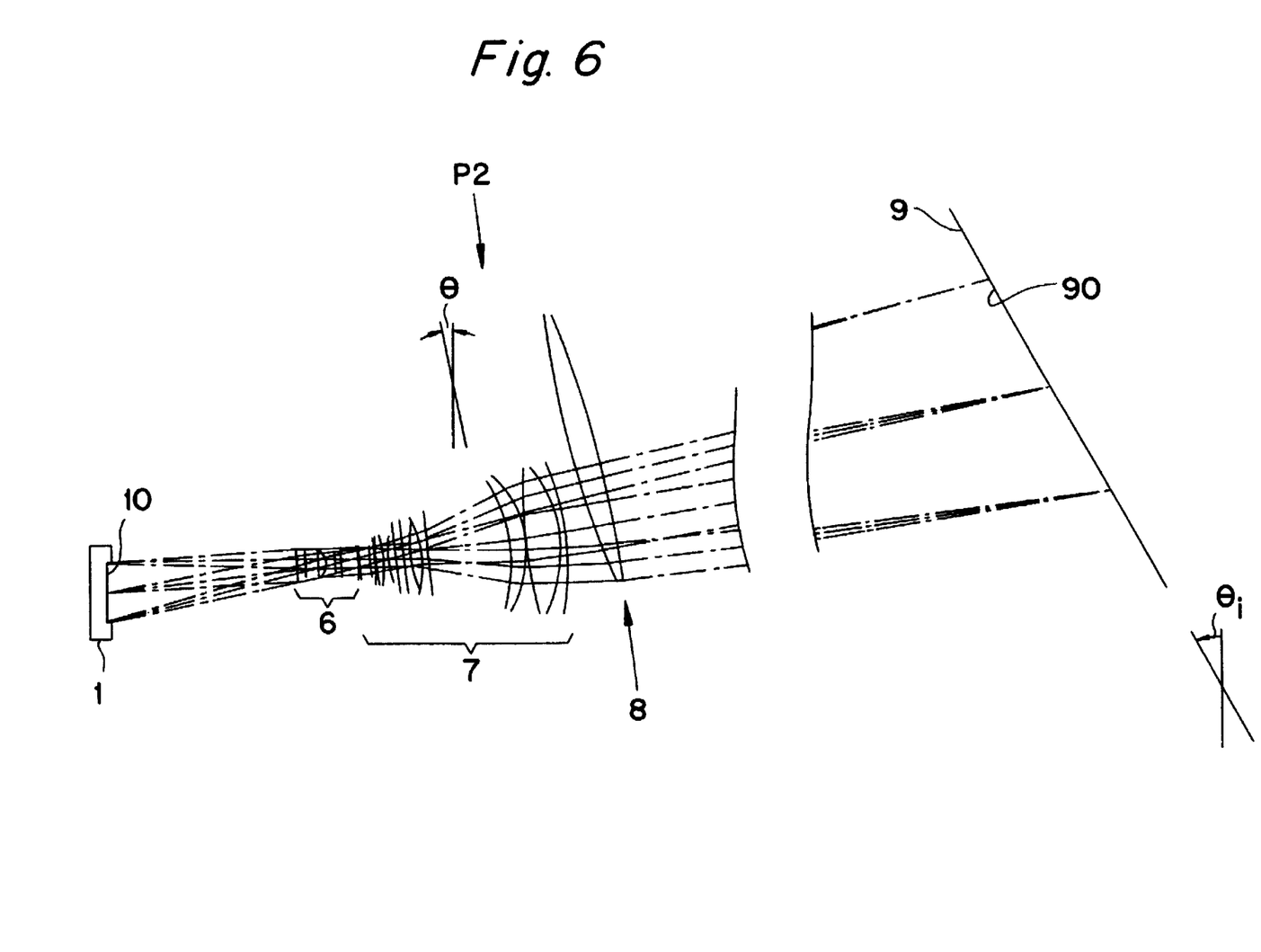
FIG. 6 briefly shows the construction of a projection optical apparatus of a second embodiment.
Figure 7:
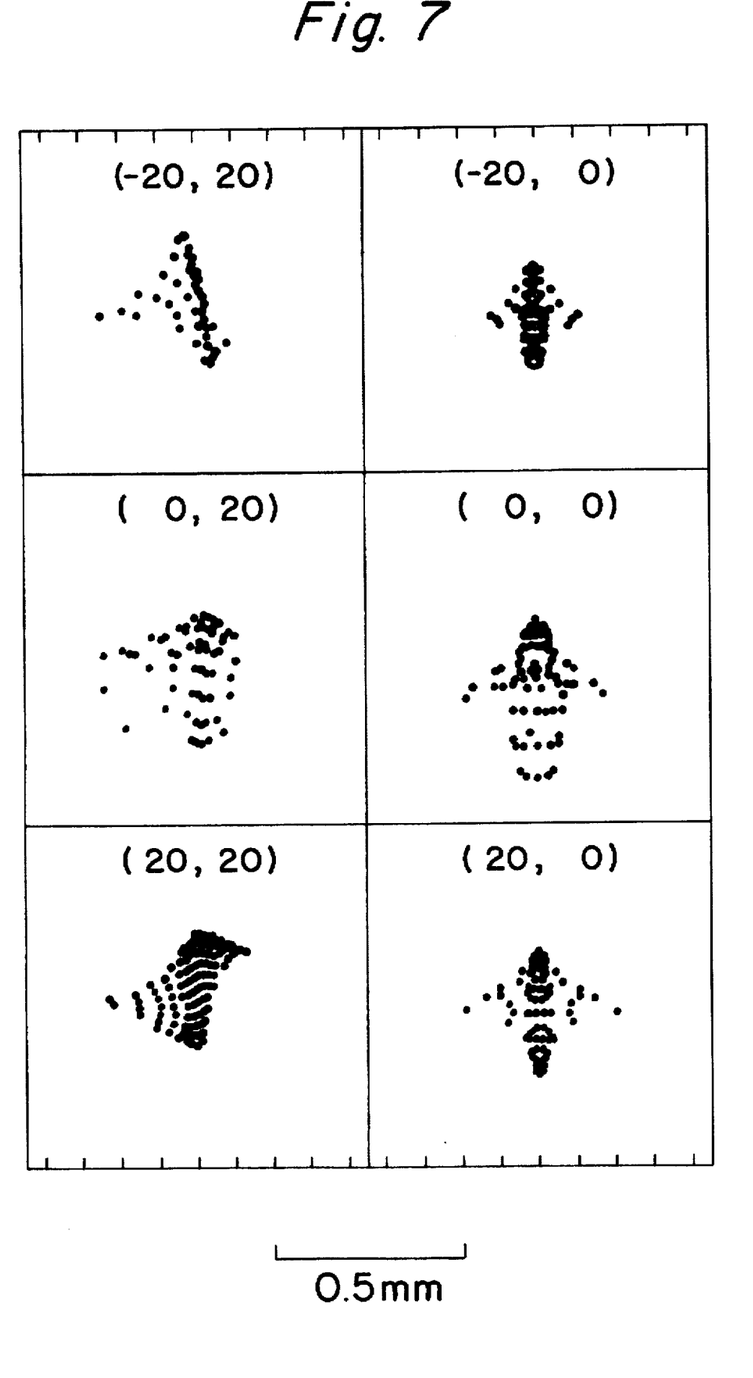
FIG. 7 is a spot diagram showing the intersection points of the light rays emitted from object points relative to the image surface.
Figure 8:
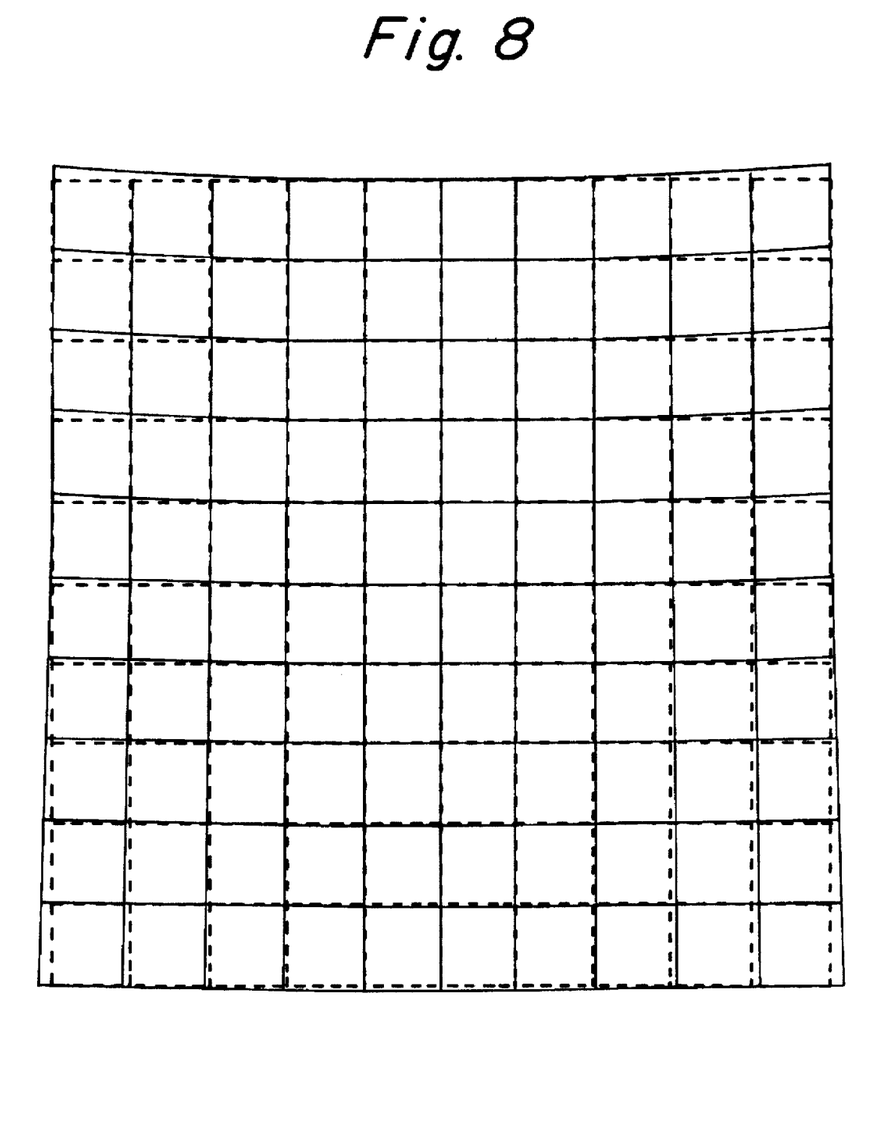
FIG. 8 illustrates the degree of distortion of a projected lattice pattern.

An oblique projection apparatus of a second embodiment is described hereinafter with reference to FIGS. 5 through 8. FIG. 5 is a section view of lens units of a second embodiment. FIG. 6 briefly shows the construction of a projection optical apparatus with the projection optical system and the optical path thereof. FIG. 7 is a spot diagram showing the intersection points of light rays from an object point on the object surface intersecting the image surface. FIG. 8 shows a lattice screen (image indicated by solid lines) enlarged (4×) on a screen. The image indicated by the dashed lines is a distortionless ideal image.

This apparatus comprises an image display device 1 providing an image on an image surface 10, which is to be enlarged and projected, the projection optical system P2, and the screen 9 for forming a final image surface 90, similar to the oblique projection apparatus of the previously described first embodiment. The object surface 10 is a square measuring 20 mm on edge in this example.

The projection optical system P1 comprises three lens units 6, 7, and 8 arranged sequentially from the object surface 10 side of the image display device 1. The three lens units 6, 7, and 8 are mutually decentered. The first lens unit 6 on the outermost object surface side comprises four lenses 61, 62, 63, 64 having the same optical axis. The second lens unit 7 comprises nine lenses 71 through 79. The second lens unit 7 has a diaphragm 70 disposed between its first and second lenses 71 and 72. The focal length fa of the second lens unit 7 is −593.8 mm and virtually infinite within the projection optical system P1. That is, the second lens unit 7 is an afocal optical system lens unit. The second lens unit 7 is inclined relative to the object surface 10.

The third lens unit 8 comprises a single lens 81 with a positive refracting power. The focal length of the third lens unit 8 is 341.0 mm in this exemplary embodiment.

The relationship between the focal length f of the overall optical system and the focal length fa of the third lens unit 8 is |fa/f|=5.4 which is also greater than 5. The inclination θi of the image surface 90 relative to the object surface 10 is about 29 degrees in this example. Projection magnification β in the center light ray vicinity passing through the center of object surface 10 is −4.00.

The inclination θ of the second lens unit 7 relative to the object surface 10 satisfies the following condition.

$$\theta i/(|\beta|\times\theta)=1.17$$

The inclination of the second lens unit 7 is achieved by rotating it around an axis parallel to the z-axis through a surface vertex of the lens surface (r9 in FIG. 5) on the outermost object surface side of the second lens unit 7.

The optical axis of the third lens unit 8 is standardized as a normal line through the center of the object surface 10 and inclined in the same direction as the inclination of the image surface 90, and is shifted to be parallel to a direction approaching the line of intersection of the object surface 10 and the image surface 90.

Parameters relating to the lens units 6, 7, and 8, and the object surface 10, and the image surface 90 are shown in Tables 4 and 5. Tables 4 and 5 are read in the same way as Tables 1 and 2.

TABLE 4

| | Radius of Curvature | Axial Distance | Refractive Index |
|---|---|---|---|
| (Lens Unit 6) | | | |
| r1 | 89.3886 | | |
| | | 2.8000 | 1.69680 |
| r2 | −35.5226 | | |
| | | 0.1000 | 1.00000 |
| r3 | 39.9890 | | |
| | | 4.0000 | 1.61800 |
| r4 | 85.3628 | | |
| | | 3.0000 | 1.00000 |
| r5 | −25.9952 | | |
| | | 3.0000 | 1.80518 |
| r6 | 65.2793 | | |
| | | 1.4000 | 1.00000 |
| r7 | 245.9380 | | |
| | | 6.0000 | 1.61800 |
| r8 | −35.5682 | | |
| | | | 1.00000 |
| (Lens Unit 7) | | | |
| r9 | 54.4698 | | |
| | | 3.8000 | 1.61800 |
| r10 | −108.1580 | | |
| | | 0.8000 | 1.00000 |
| Diaphragm 70 | ∞ (diaphragm radius 5) | | |
| | | 0.8000 | 1.00000 |
| r11 | 220.1550 | | |
| | | 2.8000 | 1.80518 |
| r12 | −32.7733 | | |
| | | 1.4000 | 1.69100 |
| r13 | 28.7551 | | |
| | | 2.8000 | 1.00000 |
| r14 | 332.6130 | | |
| | | 2.6000 | 1.80518 |
| r15 | 337.1930 | | |
| | | 2.2000 | 1.51680 |
| r16 | 46.5448 | | |
| | | 4.4000 | 1.00000 |
| r17 | −27.5995 | | |
| | | 2.2000 | 1.61800 |
| r18 | −263.0160 | | |
| | | 26.8890 | 1.00000 |
| r19 | −56.8156 | | |
| | | 5.4000 | 1.61800 |
| r20 | −36.3745 | | |
| | | 0.1000 | 1.00000 |
| r21 | 201.0770 | | |
| | | 11.2000 | 1.49310 |
| r22 | −45.8878 | | |
| | | 0.4000 | 1.00000 |
| r23 | −47.1069 | | |
| | | 1.8000 | 1.74000 |
| r24 | −88.6808 | | |
| | | | 1.00000 |
| (Lens Unit 8) | | | |
| r25 | 383.4690 | | |
| | | 8.0000 | 1.51680 |
| r26 | −323.8420 | | |
| | | | 1.00000 |

TABLE 5

| | X | Y | Z | ANG |
|---|---|---|---|---|
| Object Surf 10 | −62.3909 | −4.2257 | 0.0000 | 3.6172 |
| Unit 6 | 0.0000 | 0.0000 | 0.0000 | 0.0000 |
| Unit 7 | 20.6116 | −0.4664 | 0.0000 | −3.1711 |
| Unit 8 | 93.8121 | 32.1000 | 0.0000 | −11.3089 |
| Image Surf 90 | 509.2939 | 65.1018 | 0.0000 | −25.4928 |
| ymax: 10.0000 | ymin: −10.0000 | | | |
| zmax: 10.0000 | zmin: −10.0000 | | | |

The distortion indices of the final image surface 90 are shown in Table 6. Spot diagrams corresponding to object points of various object heights are shown in FIG. 7, and the projection image projected on screen 9 is shown in FIG. 8.

TABLE 6

| Object Hgt. | Distortion Index dy/r | Distortion Index dz/r |
|---|---|---|
| (20, 0) | −0.00091 | 0.0000 |
| (−20, 0) | 0.0038 | 0.0000 |
| (20, 20) | 0.0014 | −0.0202 |
| (0, 20) | 0.0157 | −0.0061 |
| (−20, −20) | 0.0188 | 0.0040 |

It can be determined from these distortion indices whether or not distortion is adequately corrected in the final projection image. The trapezium distortion in the final projection image is adequately corrected as shown in FIG. 8.

The oblique projection optical system of the present invention as described above is provided with a plurality of lens units which are mutually decentered, and this optical system is constructed such that the oblique projection optical system is not physically connected to a final image surface 90 on a screen 9 upon which an actual image is formed. Such a construction allows the overall length of the projection optical system to be reduced, thereby allowing a more compact design of the overall device.

A lens unit containing a diaphragm in the projection optical system comprises an afocal optical system satisfying the condition of focal length fa=|fa/fl|>5 (where f is the focal length of the overall optical system), and the oblique projection with an image surface inclination of about 30 degrees or more is accomplished with scant aberration by decentering relative to the object surface.

In further explanation of this aspect, trapezium distortion occurring on the image surface generally becomes smaller in reverse proportion to the focal length of the optical system. Therefore, if an afocal optical system is used as a unit with an infinite focal length, trapezium distortion on the image surface in oblique projection is reduced. The lens diameter and overall length of the afocal optical system increases proportionately with the projection magnification. In particular, when a bilateral telocentric optical system is used in an afocal optical system, the projected image would be the same size as the lens diameter on the outermost image surface side. Therefore, the afocal optical system unit alone cannot satisfy the demand of a compact, inexpensive design for oblique projection.

In the present invention, an afocal optical system lens unit is included among a plurality of mutually decentered lenses comprising an oblique projection optical system. In this construction, trapezium distortion generated by image surface inclination is gradually conveyed by the plurality of mutually decentered lens units. With trapezium distortion minimized, the final image surface can be enlarged and inclined by decentering by a suitable amount of the lens units of the afocal optical system relative to the object surface.

Since the magnification of the afocal optical system alone is less than the projection magnification of the total optical system, the lens diameter can be smaller compared to the projection optical system of the afocal optical system alone. Thus, the overall apparatus can be made more compact.

Since a diaphragm is arranged within the decentered afocal optical system, the light ray pass-through position in the lens anterior and posterior to the diaphragm is unchanged compared to a nondecentered state. Accordingly, aberration generated by decentering, e.g., astigmatic difference generated in the complete area of the image surface, can be suppressed. Thus, the number of decentered lens units and number of lenses constructing the units can be reduced.

Specifically, it is desirable that the inclination of the afocal lens system lens unit satisfies the following conditional equation.

$$0.2 < (1/|\beta|) \times (\theta i/\theta) < 2$$

In the above conditional equation, θ is the inclination angle via the inclination of an afocal optical system lens unit relative to an object surface, θi is an inclination angle of the image surface relative to the object surface, and β is the projection magnification in a direction including image surface inclination θi. This conditional equation calculates on-screen projection of the vicinity of the center light rays passing through the center of the object surface.

In the aforesaid conditional equation, when the lower limit is exceeded, the inclination angle θ of the afocal lens system lens unit becomes excessively large relative to a predetermined projection magnification. As a result, it is difficult to suppress aberration generated by decentering, such as astigmatic difference generated in the complete area of the image surface. When the upper limit is exceeded, the inclination angle θ of the afocal lens system lens unit becomes excessively small relative to a predetermined projection magnification. As a result, other lens units must generate large image surface inclinations. Thus, the number of lens units of the overall optical system, and the number of lenses comprising the lens units are increased, thereby making it difficult to produce a compact, inexpensive apparatus.

Consider the following aspects in achieving a compact construction using few lens units in the oblique projection optical system. That is, consider that the lens unit on the outermost image surface side has a positive refracting power, and the optical axis of the lens unit is standardized as a normal line through the center of the object surface and inclined in the same direction as the inclination of the image surface, and is positioned moving parallel to a direction approaching the line of intersection of the object surface and the image surface.

For example, when an image surface is inclined in a counterclockwise direction relative to an object surface as shown in projection optical system of FIGS. 1 and 2, the positive lens unit on the outermost image surface side is inclined in the same counterclockwise direction as the image surface, and is shifted off-axis toward a top side in the drawing. As a result, the light rays pass through the bottom portion within the lens unit. By mean of this construction, the positive lens unit on the outermost image surface side generates a linear negative distortion which increases at the bottom side at the top of the inclined image surface. This distortion is beneficial in correcting trapezium distortion, and minimizes the amount of trapezium distortion correction required from other lens units. Thus, the overall projection optical system can be accomplished via a compact construction using a small number of lenses.

According to the present invention as described above, trapezium distortion and aberration can be suitably corrected in an oblique projection optical system which enlarges and projects an image of an object surface provided via a film image, video image or the like, on a screen which is inclined relative to the object surface. Furthermore, the present invention provides such a compact and inexpensive oblique projection optical system. That is, the present invention can provide a practical oblique projection optical system and projection apparatus.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An oblique projection optical system for projecting an enlargement of an image of an object surface on a screen inclined relative to the object surface, the optical system comprising:
   a first lens unit including an afocal optical system including a diaphragm and which is eccentric relative to the object surface; and
   a second lens unit which is eccentric relative to said first lens unit,
   wherein the oblique projection optical system does not form an image before the screen.

2. The optical system according to claim 1, wherein said first lens unit includes three lenses and said diaphragm is located on the object surface side of a second lens of said three lenses.

3. The optical system according to claim 1, wherein said second lens unit comprises a single lens having a positive refracting power.

4. The optical system according to claim 1, further comprising a third lens unit which is eccentric relative to said first lens unit and is on the object side of said first lens unit.

5. The optical system according to claim 4, wherein said first, second and third lens units have the following parameters:

TABLE 1

|  | Radius of Curvature | Axial Distance | Refractive Index |
|---|---|---|---|
| (Third Lens Unit) |  |  |  |
| r1 | 101.4230 |  |  |
|  |  | 10.0000 | 1.69680 |
| r2 | −1081.4200 |  |  |
|  |  |  | 1.00000 |
| (First Lens Unit) |  |  |  |
| r3 | 50.4431 |  |  |
|  |  | 10.0000 | 1.69680 |
| r4 | 74.6787 |  |  |
|  |  | 37.0000 | 1.00000 |
| Diaphragm 30 | ∞ |  |  |
|  | (Diaphragm radius 4) |  |  |
|  |  | 1.0000 | 1.00000 |
| r5 | −1008.2400 |  |  |
|  |  | 10.0000 | 1.80518 |
| r6 | 71.1607 |  |  |
|  |  | 70.0000 | 1.000000 |
| r7 | −85.4752 |  |  |
|  |  | 15.0000 | 1.59844 |
| r8 | −57.3316 |  |  |
|  |  |  | 1.00000 |
| (Second Lens Unit) |  |  |  |
| r9 | −7780.5300 |  |  |
|  |  | 30.0000 | 1.59844 |
| r10 | −480.8660 |  |  |

TABLE 2

|  | X | Y | Z | ANG |
|---|---|---|---|---|
| Object Surf. 10 | −99.9473 | −4.6280 | 0.0000 | −0.7612 |
| Third Lens Unit | 0.0000 | 0.0000 | 0.0000 | 0.0000 |
| First Lens Unit | 16.5818 | −6.0457 | 0.0000 | −5.9433 |
| Second Lens Unit | 142.6121 | 105.4211 | 0.0000 | −23.7837 |
| Image Surf. 50 | 2199.7505 | 390.1844 | 0.0000 | −36.9177 | wherein "r1, r2, r3, . . . r8, r9, r10" refer to the various lens surfaces of lenses, "radius of curvature" refers to the radius of curvature of each lens surface (units: mm), positive symbols refer to convex surfaces and negative symbols refer to concave surfaces relative to the direction of travel of the light rays, "axial distance" refers to the spacing between adjacent lens surfaces, and axial distance between a diaphragm and an adjacent lens (units: mm), "refractive index" refers to the refractive index of material between adjacent lens surfaces in each lens unit, and between a diaphragm and adjacent lens surface, reference symbols X, Y, Z shown in Table 2 refer to surface vertex coordinates (X, Y, Z) of the lens surfaces (r1, r3, r9) of the outermost lens unit on the object surface side, coordinates (X, Y, Z) refer to the center coordinates of the object surface and image surface, "ANG" refers to the inclination angle (units: degrees) of the X-axis relative to the optical axis of a lens unit, and the inclination angle of the X-axis relative to the normal line of the object surface and image surface wherein counterclockwise rotation in the drawing is designated as being negative.

6. The optical system according to claim 1, wherein said first lens unit is inclined relative to said object surface by an inclination θ satisfied by the following condition θi/(|β|×θ) =0.59, where θi is the inclination of said screen relative to said object surface and β is projection magnification.

7. The optical system according to claim 1, wherein said first lens unit includes nine lenses with said diaphragm being located on the object surface side of a second of said nine lenses.

8. The optical system according to claim 1, wherein said second lens unit comprises a single lens having a positive refracting power.

9. The optical system according to claim 1, further comprising a third lens unit on the object surface side of said first lens unit and is eccentric relative to said first lens unit.

10. The optical system according to claim 9, wherein said first, second and third lens units have the following parameters:

TABLE 1

|  | Radius of Curvature | Axial Distance | Refractive Index |
|---|---|---|---|
| (Third Lens Unit) |  |  |  |
| r1 | 89.3886 |  |  |
|  |  | 2.8000 | 1.69680 |
| r2 | −35.5226 |  |  |
|  |  | 0.1000 | 1.00000 |
| r3 | 39.9890 |  |  |
|  |  | 4.0000 | 1.61800 |
| r4 | 85.3628 |  |  |
|  |  | 3.0000 | 1.00000 |
| r5 | −25.9952 |  |  |
|  |  | 3.0000 | 1.80518 |
| r6 | 65.2793 |  |  |
|  |  | 1.4000 | 1.00000 |
| r7 | 245.9380 |  |  |
|  |  | 6.0000 | 1.61800 |
| r8 | −35.5682 |  |  |
|  |  |  | 1.00000 |
| (First Lens Unit) |  |  |  |
| r9 | 54.4698 |  |  |
|  |  | 3.8000 | 1.61800 |
| r10 | −108.1580 |  |  |
|  |  | 0.8000 | 1.00000 |
| Diaphragm 70 | ∞ |  |  |
|  | (diaphragm radius 5) |  |  |
|  |  | 0.8000 | 1.00000 |
| r11 | 220.1550 |  |  |
|  |  | 2.8000 | 1.80518 |
| r12 | −32.7733 |  |  |
|  |  | 1.4000 | 1.69100 |

TABLE 1-continued

|     | Radius of Curvature | Axial Distance | Refractive Index |
|-----|---------------------|----------------|------------------|
| r13 | 28.7551             |                |                  |
|     |                     | 2.8000         | 1.00000          |
| r14 | 332.6130            |                |                  |
|     |                     | 2.6000         | 1.80518          |
| r15 | 337.1930            |                |                  |
|     |                     | 2.2000         | 1.51680          |
| r16 | 46.5448             |                |                  |
|     |                     | 4.4000         | 1.00000          |
| r17 | −27.5995            |                |                  |
|     |                     | 2.2000         | 1.61800          |
| r18 | −263.0160           |                |                  |
|     |                     | 26.8890        | 1.00000          |
| r19 | −56.8156            |                |                  |
|     |                     | 5.4000         | 1.61800          |
| r20 | −36.3745            |                |                  |
|     |                     | 0.1000         | 1.00000          |
| r21 | 201.0770            |                |                  |
|     |                     | 11.2000        | 1.49310          |
| r22 | −45.8878            |                |                  |
|     |                     | 0.4000         | 1.00000          |
| r23 | −47.1069            |                |                  |
|     |                     | 1.8000         | 1.74000          |
| r24 | −88.6808            |                |                  |
|     |                     |                | 1.00000          |
| (Second Lens Unit) |      |                |                  |
| r25 | 383.4690            |                |                  |
|     |                     | 8.0000         | 1.51680          |
| r26 | −323.8420           |                |                  |
|     |                     |                | 1.00000          |

TABLE 2

|                 | X        | Y       | Z      | ANG      |
|-----------------|----------|---------|--------|----------|
| Object Surf 10  | −62.3909 | −4.2257 | 0.0000 | 3.6172   |
| Third Lens Unit | 0.0000   | 0.0000  | 0.0000 | 0.0000   |
| First Lens Unit | 20.6116  | −0.4664 | 0.0000 | −3.1711  |
| Second Lens Unit| 93.8121  | 32.1000 | 0.0000 | −11.3089 |
| Image Surf 90   | 509.2939 | 65.1018 | 0.0000 | −25.4928 | wherein "r1, r2, r3, ... r26" refer to the various lens surfaces of lenses, "radius of curvature" refers to the radius of curvature of each lens surface (units: mm), positive symbols refer to convex surfaces and negative symbols refer to concave surfaces relative to the direction of travel of the light rays, "axial distance" refers to the spacing between adjacent lens surfaces, and axial distance between a diaphragm and an adjacent lens (units: mm), "refractive index" refers to the refractive index of material between adjacent lens surfaces in each lens unit, and between a diaphragm and adjacent lens surface, reference symbols X, Y, Z shown in Table 2 refer to surface vertex coordinates (X, Y, Z) of the lens surfaces (r1, r3, r9) of the outermost lens unit on the object surface side, coordinates (X, Y, Z) refer to the center coordinates of the object surface and image surface, "ANG" refers to the inclination angle (units: degrees) of the X-axis relative to the optical axis of a lens unit, and the inclination angle of the X-axis relative to the normal line of the object surface and image surface wherein counterclockwise rotation in the drawing is designated as being negative.

11. The optical system according to claim 1, wherein said first lens unit is inclined relative to said object surface by an inclination θ satisfied by the following condition θi/(|β|×θ) =1.17, where Θi is the inclination of said screen relative to said object surface and β is projection magnification.

12. The optical system according to claim 1, wherein the relationship between a focal length f of the overall optical system and the focal length fa of the first lens unit is |fa/f|>5.

13. An oblique projection optical system for projecting an enlargement of an image of an object surface on a screen inclined relative to the object surface, the optical system comprising:

a plurality of mutually eccentric lens units which includes an afocal lens unit having a diaphragm and disposed eccentrically to an object surface;

wherein the oblique projection optical system does not form an image before the screen and satisfies the expression |fa/f|>5, wherein f is a focal length of the overall projection optical system and fa is a focal length of the afocal lens unit.

14. The optical system according to claim 13, wherein a first lens unit of said plurality of mutually eccentric lens units including three lenses and said diaphragm is located on the object surface side of a second of said three lenses.

15. The optical system according to claim 14, wherein a second lens unit of said plurality of mutually eccentric lens units comprises a single lens having a positive refracting power.

16. The optical system according to claim 15, further comprising a third lens unit which is eccentric relative to said first lens unit and is on the object side of said first lens unit.

17. The optical system according to claim 13, wherein said first lens unit includes nine lenses with said diaphragm being located on the object surface side of a second of said nine lenses.

18. The optical system according to claim 15, further comprising a third lens unit on the object surface side of said first lens unit and is eccentric relative to said first lens unit.

19. An oblique projection optical system which projects and enlargement of an image of an object surface on a screen inclined relative to said object surface, the optical system comprising:

a first lens unit which is an afocal optical system including a diaphragm and which is eccentric relative to the object surface; and a second lens unit which is eccentric relative to the first lens unit, disposed on the side closest to the screen, and provided having positive refracting power, wherein an optical axis of the second lens is inclined in the same direction as the inclination of the screen surface, and is moved parallel to a direction approaching an intersection of the object surface and the screen surface;

wherein the oblique projection optical system does not form an image before the screen.

20. The optical system according to claim 19, wherein said first lens unit includes three lenses and said diaphragm is located on the object surface side of a second of said three lenses.

21. The optical system according to claim 19, further comprising a third lens unit which is eccentric relative to said first lens unit and is on the object side of said first lens unit.

22. The optical system according to claim 19, wherein said first lens unit includes nine lenses with said diaphragm being located on the object surface side of a second of said nine lenses.

23. The optical system according to claim 19, wherein the relationship between a focal length f of the overall optical system and the focal length fa of the first lens unit is |fa/f|>5.

* * * * *